United States Patent
Thomas et al.

(12) 
(10) Patent No.: US 6,186,899 B1
(45) Date of Patent: Feb. 13, 2001

(54) CONSTANT VELOCITY JOINT

(75) Inventors: Steven Mark Thomas, Saginaw; David Charles Flaugher, Midland, both of MI (US)

(73) Assignee: Delphi Technologies, Inc., Troy, MI (US)

(*) Notice: Under 35 U.S.C. 154(b), the term of this patent shall be extended for 0 days.

(21) Appl. No.: 09/200,252

(22) Filed: Nov. 25, 1998

(51) Int. Cl.⁷ .................................................. F16D 3/16

(52) U.S. Cl. ............................................. 464/145; 464/143

(58) Field of Search ................................ 464/145, 143, 464/141, 906

(56) References Cited

U.S. PATENT DOCUMENTS

| | | |
|---|---|---|
| 1,916,442 | 7/1933 | Rzenna . |
| 2,838,919 | 6/1958 | Cull . |
| 3,633,382 | 1/1972 | Westercamp . |
| 3,919,861 | 11/1975 | Bellomo . |
| 4,331,005 * | 5/1982 | Hirai et al. ............................. 454/145 |
| 4,377,385 * | 3/1983 | Sindelar ................................. 454/142 |
| 4,459,122 * | 7/1984 | Rehfeld ................................. 454/143 |
| 4,494,941 * | 1/1985 | Hirai et al. ............................. 454/145 |
| 4,915,672 | 4/1990 | Girgus . |
| 5,122,096 | 6/1992 | Aucktor et al. . |
| 5,288,273 | 2/1994 | Krude . |
| 5,782,696 | 7/1998 | Guimbretiere . |

FOREIGN PATENT DOCUMENTS

| | | |
|---|---|---|
| 19633166 | 3/1998 | (DE) . |
| 0802341 | 10/1997 | (EP) . |

OTHER PUBLICATIONS

Rzeppa; UNIVERSAL JOINT DRIVES; Apr. 1953; pp. 162–170 MACHINE DESIGN.
Miller; CONSTANT VELOCITY UNIVERSAL BALL JOINTS–THEIR APPLICATION IN WHEEL DRIVES; Society of Automative Engineers, INTERNATIONAL AUTOMOTIVE ENGINEERING CONGRESS, JAN. 11–15, 1965.

* cited by examiner

Primary Examiner—Lynne H. Browne
Assistant Examiner—Aaron Dunwoody
(74) Attorney, Agent, or Firm—Edmund P. Anderson

(57) ABSTRACT

A constant velocity joint provides an increase in maximum joint angle without a corresponding increase in joint package size. The joint has a modified radial groove profile which significantly decreases ball movement radially inward of the ball center radius so that the ball cage may be increased in diameter without a corresponding increase in ball center radius. The radial groove profile provides a required predetermined funnel angle for ball control at the ball centered point of contact but minimal change in distance from the joint center over most of the axially inner side of the grooves in the outer joint member. One embodiment provides a circular arc centered on the joint center axially inward of the ball center point of contact, a circular arc centered on a point offset from the joint center on the axially outer side of the ball centered point of contact and a straight line on the axially inner side of the ball centered point of contact joining and tangent to both arcs. Another embodiment provides an elliptical profile based on a major axis centered on the joint center and angled with respect to the joint axis to provide a predetermined funnel angle when the joint angle is zero. The joint structure is applicable to both undercut and undercut-free designs and provides an increase in maximum joint angle in either.

13 Claims, 4 Drawing Sheets

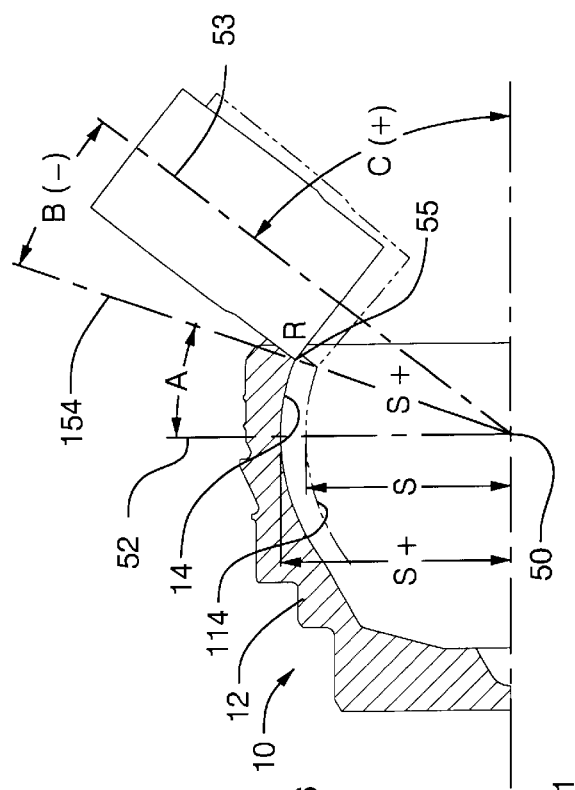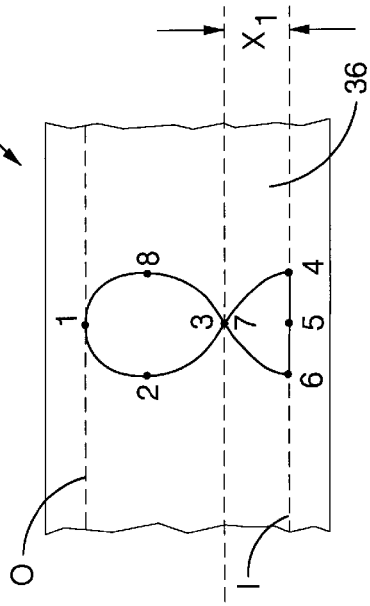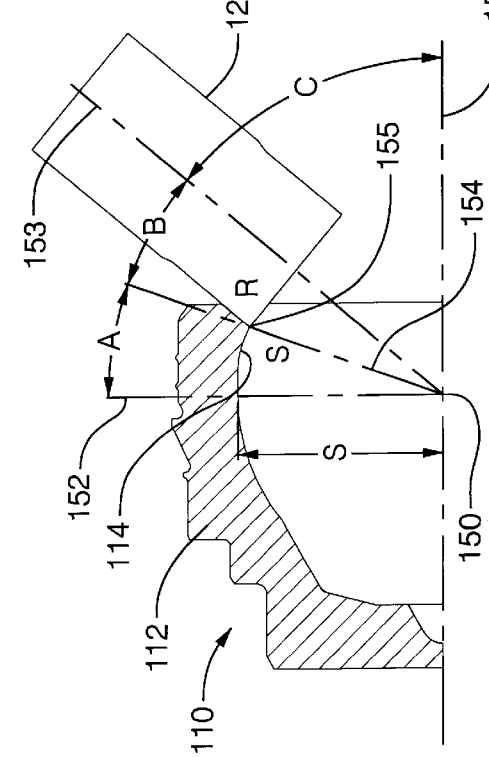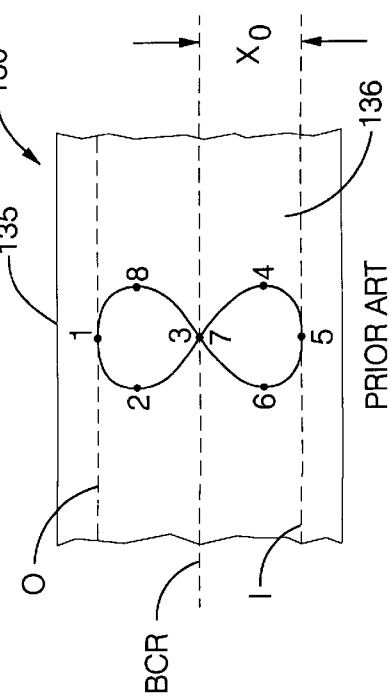
PRIOR ART
FIG. 3
FIG. 4
PRIOR ART
FIG. 5
FIG. 6

CONSTANT VELOCITY JOINT

TECHNICAL FIELD

The technical field of this invention is a constant velocity joint.

BACKGROUND OF THE INVENTION

A well known constant velocity joint, used in the drive axles of front wheel drive motor vehicles, is the "Rzeppa" joint, described in U.S. Pat. No. 2,046,584, in which a driving member and a driven member transmit torque through a plurality (generally 6) of balls captured in longitudinal grooves in the driving and driven member and a cage. The geometry of the arrangement ensures that the balls are always aligned in a plane which bisects the angle between a pair of planes normal to the driving and driven axes of rotation; and constant velocity rotation of the driven member is thus assured, regardless of the joint angle between driving and driven members. As the joint angle increases, however, some portion of the driven member, usually the output shaft, eventually abuts some portion of the driving member to define a maximum joint angle. A variety of design factors and constraints work together to limit this maximum joint angle, and considerable effort has been expended in attempting to increase it. Such increases in maximum joint angle have generally come at the cost of an increase in joint package size, which is not desirable in the crowded engine compartments of front drive vehicles.

A modification of the original "Rzeppa" design is shown in U.S. Pat. No. 3,879,960 to Welschof et al. The constant velocity joint of this design is undercut-free: that is, the grooves of the outer joint member have a radial profile at the open end which is parallel to the joint axis so that they are not undercut in the longitudinal direction. The undercut-free design of this reference provides a reasonably high maximum joint angle; but an even higher joint angle is desired.

SUMMARY OF THE INVENTION

The constant velocity joint of this invention provides an increase in maximum joint angle, relative to similarly constructed joints of the prior art, without a corresponding increase in joint package size. Thus, for any desired maximum joint angle, the constant velocity joint of this invention allows a smaller joint package size than a similarly constructed joint of the prior art.

The constant velocity joint of this invention has a modified radial groove profile which significantly decreases ball movement radially inward of the ball center radius so that the ball cage may be increased in diameter without a corresponding increase in ball center radius. The radial groove profile provides a required predetermined funnel angle for ball control at the ball centered point of contact but minimal change in distance from the joint center over most of the axially inner side of the grooves in the outer joint member. One embodiment provides a circular arc centered on the joint center axially inward of the ball center point of contact, a circular arc centered on a point offset from the joint center on the axially outer side of the ball centered point of contact and a straight line on the axially inner side of the ball centered point of contact joining and tangent to both arcs. Another embodiment provides an elliptical profile based on a major axis centered on the joint center and angled with respect to the joint axis to provide a predetermined funnel angle when the joint angle is zero. The joint structure is applicable to both undercut and undercut-free designs and provides an increase in maximum joint angle in either.

BRIEF DESCRIPTION OF THE DRAWINGS

FIG. 3 is a diagram illustrating a geometric constraint on joint angle in a constant velocity joint of the prior art.

FIG. 4 is a diagram illustrating, in comparison with the diagram of FIG. 3, the larger geometrically constrained joint angle of an embodiment of a constant velocity joint according to this invention.

FIG. 5 illustrates radial movement of a ball within the ball cage of a constant velocity joint of the prior art.

FIG. 6 illustrates radial movement of a ball within the ball cage of an embodiment of a constant velocity joint according to this invention.

DESCRIPTION OF THE PREFERRED EMBODIMENT

Figure 1:
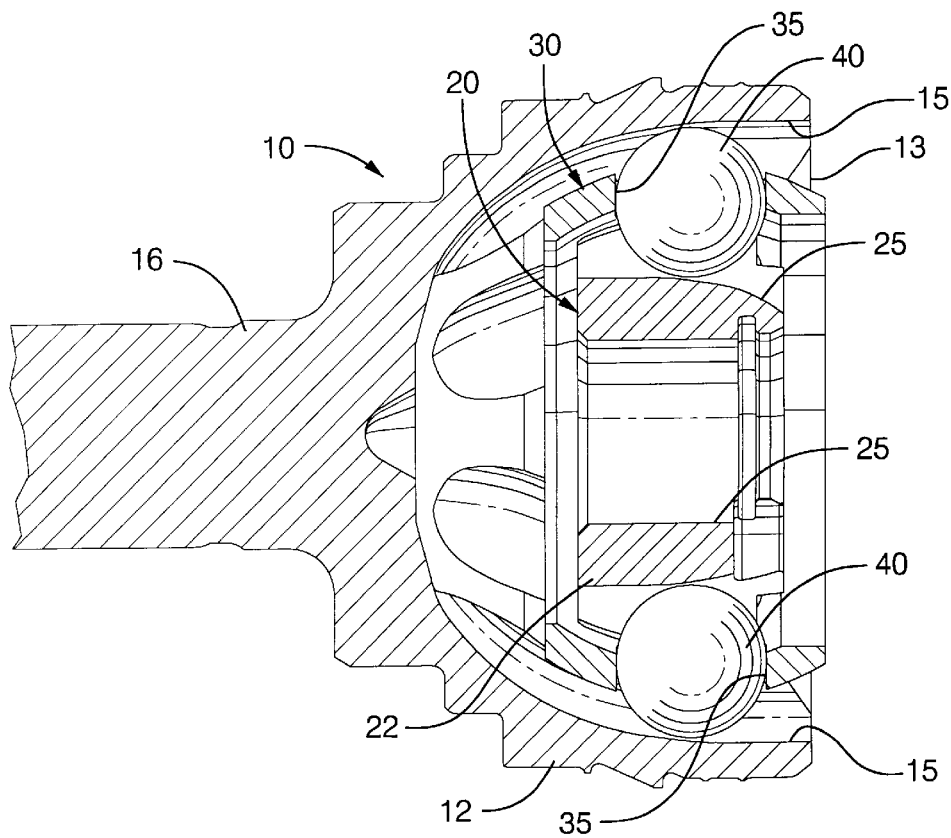
FIG. 1 is an axial section of a preferred embodiment of a constant velocity joint according to this invention, the section taken through a pair of opposing balls.
Figure 2:
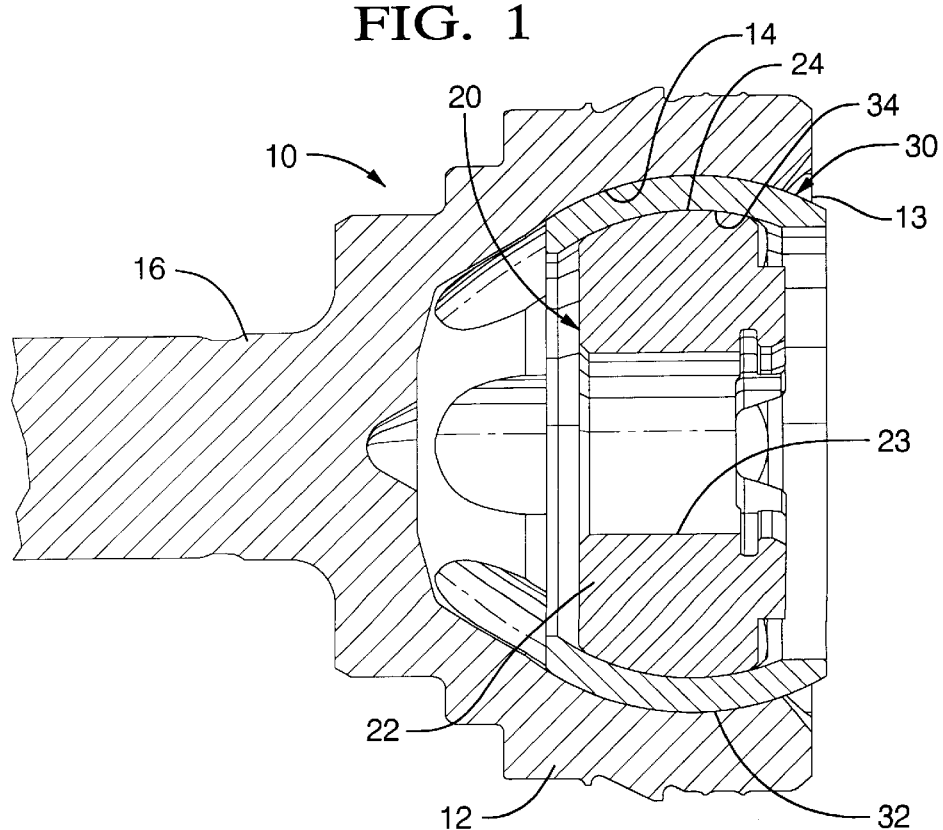
FIG 2 is an axial section of the constant velocity joint of FIG. 1 which is rotated by 30 degrees relative to the section shown in FIG. 1.

The constant velocity joint of FIGS. 1 and 2 has an outer joint member 10 with an outer race 12 having an inner spherical surface 14 and an integral shaft 16 axially aligned with outer race 12. The joint further has an inner joint member 20 with an inner race 22 having an outer spherical surface 24 and is adapted in opening 23 to receive an axially aligned shaft, not shown in FIGS. 1 and 2 but partially shown in FIG. 4, which projects in a direction generally opposite to that of shaft 16. In this embodiment, as in most such constant velocity joints, outer joint member 10 is the driven member and inner joint member 20 is the driving member; but the invention is not so limited.

Inner spherical surface 14 of outer joint member 10 is broken by a plurality of longitudinal grooves 15, which extend axially from the open end 13 of outer race 12 in the direction of shaft 16. Grooves 15 are arranged in opposed pairs and equally spaced circumferentially around inner spherical surface 14. Likewise, outer spherical surface 24 of inner race 20 is broken by a plurality of longitudinal grooves 25, which extend axially thereacross. Grooves 25 are arranged in opposed pairs and equally spaced circumferentially around outer spherical surface 24. Grooves 15 and 25 will be further described below.

A cage 30 is provided between outer joint member 10 and inner joint member 20. Cage 30 has an outer spherical surface 32 which abuts inner spherical surface 14 of outer race 12 and further has an inner spherical surface 34 which abuts outer spherical surface 24 of inner race 22. The spherical surfaces of outer race 12, inner race 22 and cage 30 are all formed from centers which coincide in the assembled joint at a single point called the joint center. Thus, outer race 12, inner race 22 and cage 30 therebetween are each free to rotate independently of the others, within limits, except as constrained by the balls to be described.

A plurality of cage windows 35, equal in number to the number of grooves 15 and grooves 25, are equally spaced circumferentially around cage 30. Cage windows 35 are preferably rectangular openings through cage 30 from outer spherical surface 32 to inner spherical surface 34 having opposing axially extending sides aligned in two parallel axial planes in the normal manner. Each cage window 35 retains a ball 40, which is also retained in one of grooves 15 of outer race 12 and in one of grooves 25 of inner race 22. The number of balls 40 is thus equal to the number of cage windows 35, grooves 15 and grooves 25: namely 6 in this embodiment.

The arrangement described to this point is similar to a standard "Rzeppa" constant velocity joint and generally operates in the manner normal for such joints. In operation, balls 40 transmit torque between outer race 12 and inner race 22 to turn output shaft 16. When the joint angle is zero, with inner joint member 20 and outer joint member 10 (and thus input and output shafts) coaxial, cage 35 maintains balls 40 with the ball centers in a single plane normal to the axis. When the joint angle becomes non-zero, grooves 15 become non-parallel with grooves 25 except in the plane of the joint angle. The position of each ball 40 is then determined by the crossing point of the particular one of grooves 15 and the particular one of grooves 25 which contains that ball; and the balls thus move back and forth in the grooves in a cycle synchronized with rotation of the joint. As each ball momentarily passes through the plane of the joint angle, the grooves momentarily become parallel, but the cage maintains the ball in the proper position. Provided that the grooves are correctly designed, the balls are thus automatically maintained at all times with their centers in a plane that bisects the angle between planes normal to the outer member and the inner member. The constant velocity joint of this invention differs from that of other "Rzeppa" joints in providing a new design of the grooves 15 and 25 which allows cage 35 to be made radially larger without increasing the ball center radius (BCR). The result is a greater maximum joint angle with substantially no increase in the package size of the joint.

The main limitation on maximum joint angle can be seen in FIG. 3, which represents a similar "Rzeppa" joint of the prior art. Only one half outer race 112 of outer joint member 110 is shown; and only an attached shaft 126 of a corresponding inner race is shown. All other parts are removed for simplicity, but they are understood to be present and operable as described above to determine the relative positions of the parts shown. In FIG. 3, the joint center 150 is shown as the intersection of four lines: the joint axis 151 (which is also the axis of outer joint member 10), normal line 152 (which is perpendicular to joint axis 151 in the plane of the joint angle: the plane of FIG. 3), the axis 153 of shaft 126, which is also the axis of the attached inner race and thus defines the joint angle with joint axis 151, and a line 154 from joint center 151 through point 155. Point 155 is the first point of contact between shaft 126 being rotated counter-clockwise in FIG. 3 and outer race 112 and thus defines the maximum joint angle. Point 155 is located at the outer (right) edge of inner spherical surface 114.

The maximum joint angle is shown in FIG. 3 as angle "C". In order for this angle to increase, the sum of angles "A" and "B" must decrease. But angle "A" represents the amount of spherical "wrap-around" which is required to retain the cage within outer race 112. Assuming the joint is optimally designed, this angle cannot be decreased without decreasing this retention capability below its design value. Thus, in order for angle "C" to increase, angle "B" must decrease. But, again assuming optimal joint design, angle "B" cannot be decreased by reducing radius "R" of shaft 126 without reducing the strength of shaft 126 below its design value.

Angle "B" can be reduced, however, by increasing radius "S" of inner spherical surface 114. FIG. 4 shows a joint corresponding to that of FIGS. 1 and 2, with a new, larger radius "S+", which results in a new inner spherical surface 14. For reference, the original spherical surface 114 is shown as a dashed line. The amount of increase is also exaggerated in FIG. 4 for demonstration purposes, and is not to be considered in scale. The new point of contact 55 between shaft 26 and outer race 12 is still on the original line 154 (angle "A" relative to normal line 52 has not changed). But because radius "R" of shaft 26 subtends a smaller arc at the larger distance from joint center 50, the former axis 153 of shaft 126 has now moved counter-clockwise to become the new axis 53 of shaft 26. Former angle "13" has decreased, and joint angle "C" has increased. An increase on the order of 3 degrees has been achieved by the inventor: for example, from 47 to 50 degrees in an undercut-free joint.

With spherical surface 14 at a greater distance from the joint axis, cage 30 and spherical surface 24 are also enlarged radially by essentially similar distances. But the ball center radius (BCR), which is the distance from the joint center to the centers of the balls at zero joint angle, is not significantly changed. Thus, it is possible to avoid increasing the joint package size. It is necessary, however, to provide new profiles for grooves 6 and 25 to create a different ball movement within cage windows 35 consistent with constant velocity rotation of the joint.

When the joint angle is non-zero, balls 40 move in and out radially relative to the joint center as they move back and forth along the grooves. This is due to the groove geometry: in particular, the fact that the grooves are constructed relative to a center of rotation offset from the joint center. The balls pass through the ball center radius twice during each rotation of the joint as they move outward beyond the ball center radius and inward within the ball center radius. Since cage 30 moves with a constant radius centered on the joint center, the balls move radially inward and outward relative to cage 30. The movement can be pictured in a prior art joint in FIG. 5 as the movement of a spot contact of a ball on an inner surface 136 of a window 135 in cage 130. With the extreme point of ball movement in the groove toward the open end of outer race 112 labeled "O", the centered position labeled "BCR" and the extreme point of ball movement in the groove toward the closed end of outer race 112 labeled "I", the movement describes generally a figure eight pattern on the cage window surface. This pattern at least partially determines the dimensions of the cage, since cage 130 must retain the balls at all times. It can be seen that, if cage 130 is moved significantly outward with an increase in its radius without changing the ball center radius, the ball movement of the prior art grooves can move the contact point completely off the cage at the inner end of ball travel along the groove at large joint angles; and this is an undesirable result. As previously mentioned, if the ball center radius is increased along with the cage radius, this causes the entire joint package to increase in size; and this is not a preferred result.

The groove geometry of the joint of this invention allows an increase in cage radius without a significant corresponding increase in the ball center radius by changing the groove geometry to reduce the radial movement of the balls below the ball center radius while increasing it above the ball center radius. This is demonstrated in FIG. 6, which shows cage 30 moved upward (radially outward) relative to the ball center radius. The distance between the ball center radius and the radially innermost point "I" is seen to be reduced from $X_0$ to $X_1$ so that the contact point remains on cage window inner surface 36 through an entire rotation of the joint. This enables the cage to be radially enlarged without correspondingly enlarging the ball center radius, and thus joint package size; and the larger cage permits a greater joint angle. This change can be expressed as an increase in the ratio $R_x$=BCR/X, where BCR is the ball center radius of the joint at a joint angle of zero and X is the maximum travel of the ball centers below the ball center radius at a joint angle of 46 degrees. Typical values of $R_x$ for joints of the prior art are in a range around 18. Values achieved in this invention exceed 45 and have been as high as 100.

Figure 7:
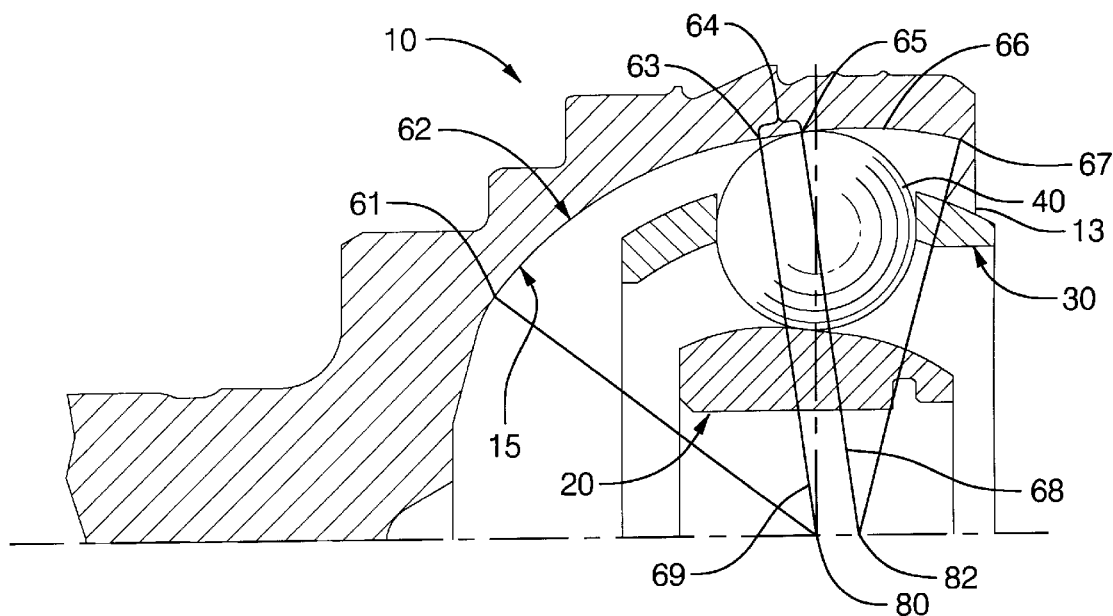
FIG. 7 describes the radial profile of ball grooves in the outer joint member of an undercut embodiment of the constant velocity joint of this invention.
Figure 8:
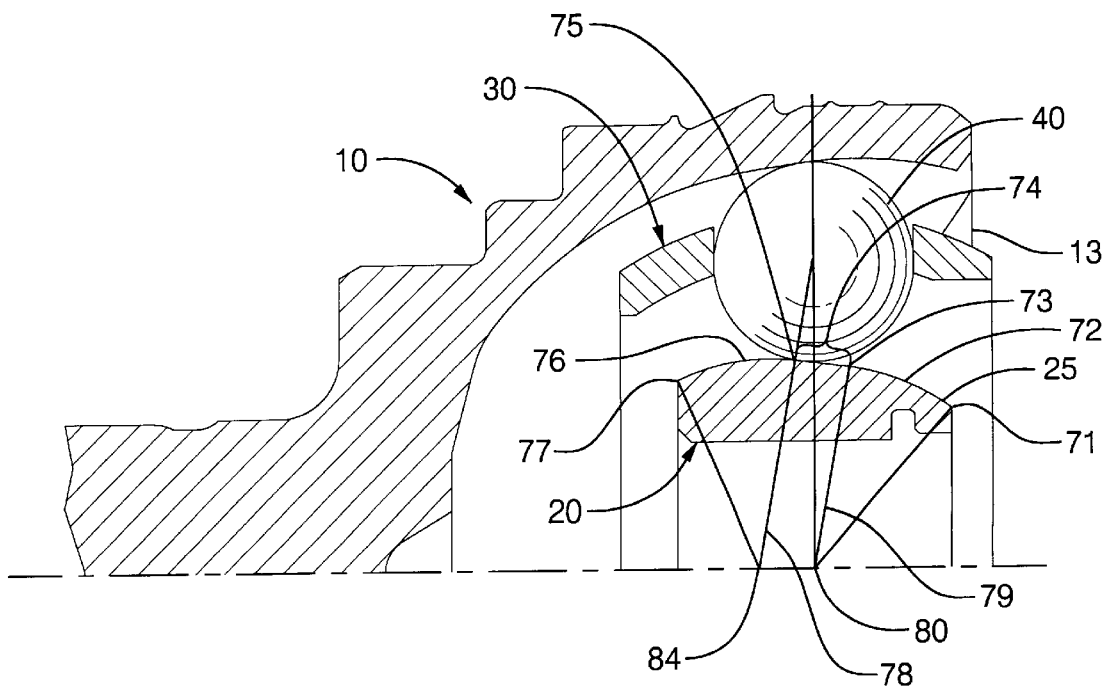
FIG. 8 describes the radial profile of ball grooves in the inner joint member of an undercut embodiment of the constant velocity joint of this invention.

The groove geometry that produces the beneficial ball movement shown in FIG. 6 is described with reference to FIGS. 7 and 8, in which a ball 40 is shown in the ball centered position in an undercut joint. FIG. 7 describes the radial groove profile of outer race 12 in outer joint member 10, and FIG. 8 describes the radial groove profile of inner race 22 in inner joint member 20. For grooves 1. of outer race 12, the groove geometry axially outward (toward the open end of outer joint member 10) from the ball centered position shown is similar to a standard joint of the prior art: a circular arc 66 extending from point 65 outward to the outer end of the groove at point 67. Arc 66 is referenced to a center 82 offset in the axially outer direction from the joint center 80 as shown. Similarly, for grooves 25 of inner race 22, the groove geometry axially inward (toward the closed end of outer joint member 10) from the ball centered position shown is a circular arc 76 extending from a point 75 inward to the inner end of the groove at point 77. Arc 76 is referenced to a center 84 offset in the axially inner direction from the joint center 80 by an amount equal to the offset between centers 80 and 82. Arcs 66 and 76, both being referenced to points offset from joint center 80, produce radial movement of ball 40 above the ball center radius, as shown in the upper lines 1-2-3 and 7-8-1 in FIG. 6.

In grooves 15, a second circular arc 62 extends from a point 63 inward to the inner end of the groove at point 61, but it is centered with reference to joint center 80. A similar second arc 72 in grooves 25 extends from point 73 outward to the outer end of the groove at point 71, and is also centered with reference to joint center 80. Arcs 62 and 72, both being centered on joint center 80, produce substantially no radial movement of the balls when traveling along this part of the groove, as shown by horizontal line 4-5-6 of FIG. 6. These arcs produce a funnel angle of zero, but no funnel angle is required in this region of the grooves, since the groove crossing angle produced by the joint angle is sufficient for ball management. Although a circular arc is shown—and this is preferred since it results in substantially zero radial ball movement, a variety of curves are possible which are not perfectly circular but which substantially approximate a circular arc with little variation from a constant distance from the joint center.

In grooves 15, arcs and 66 and 62 are joined by any smooth, reasonably straight line segment. A preferred such line segment is a straight line 64 tangent to each of arcs 66 and 62. Such a line segment may be constructed by drawing line 68 from offset center 82 outward through the ball center to define the inner end point 65 of arc 66 and then drawing a parallel line 69 from joint center 80 to define the outer end point 63 of arc 62. The joining line is then drawn between points 65 and 63. For grooves 25, a similar line 74 is constructed tangent to arcs 76 and 72 by drawing line 78 from offset center 84 to point 75, constructing parallel line 79 from joint center 80 to point 73 and connecting points 75 and 73. Lines 64 and 74 provide a smooth path for balls 40 between the connected arcs and also, together with the connected ends of arcs 66 and 76, produce a predetermined minimum funnel angle (e.g. 8 degrees in one embodiment) in the ball centered position of balls 40 as shown. The funnel angle is the angle between lines tangent to the points of contact between a ball 40 and grooves 15 and 25; and a minimum funnel angle is required for ball management when the joint angle is zero.

Figure 9:
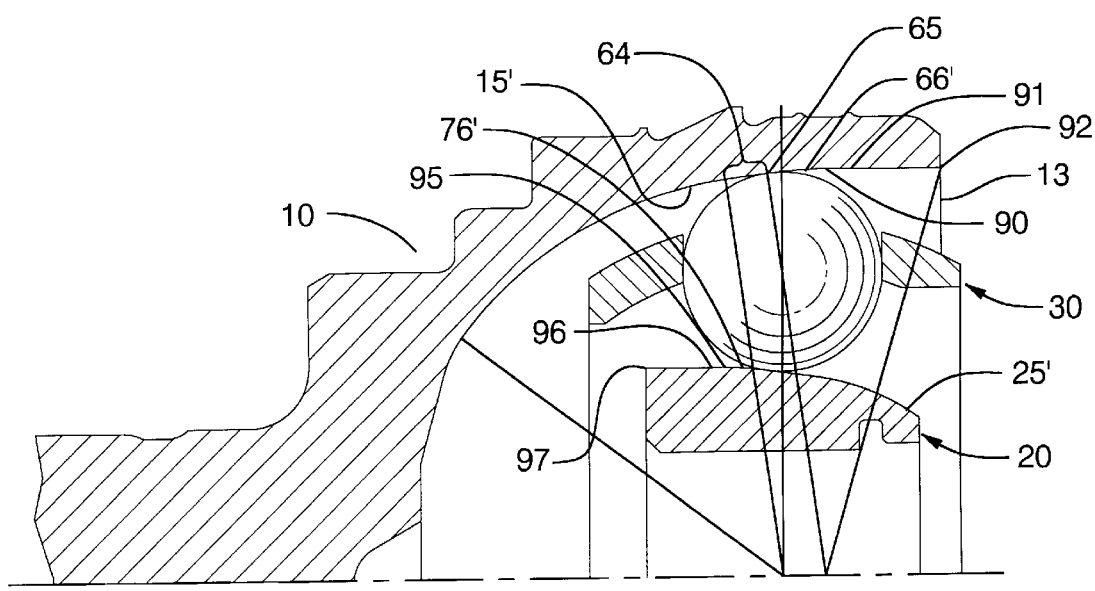
FIG. 9 describes the radial profile of ball grooves in the outer and inner joint members of an undercut-free embodiment of the constant velocity joint of this invention.

A slight modification of the groove geometry described above produces an undercut-free joint, as seen in FIG. 9, which is actually the construction of the joint in FIGS. 1 and 2. A tangent is drawn from the radially outermost point of arc 66 outward toward the open end of outer joint member 10. In undercut-free groove 15', the portion of arc 66 outward of the tangent point 90 is replaced by the tangent line 91, which thus extends in a straight line parallel to the joint axis between point 90 and a point 92 at the open end of the joint. Arc 66', which is the remaining portion of arc 66, connects tangent line 91, at point 90, to line 64 at point 65, as previously described. Similarly, in undercut-free groove 25', a tangent is drawn from the radially outermost point of arc 66 inward toward the closed end of outer joint member 10. The portion of arc 76 inward of this tangent point 95 is replaced by the tangent line 96, which thus extends in a straight line parallel to the joint axis between point 95 and a point 97 at the inner end of joint member 20. Arc 76', which is the remaining portion of arc 76, connects tangent line 96, at point 95, to line 74 at point 75, as previously described. The remainder of grooves 15' and 25' are identical to grooves 15 and 25 of FIGS. 7 and 8.

Figure 10:
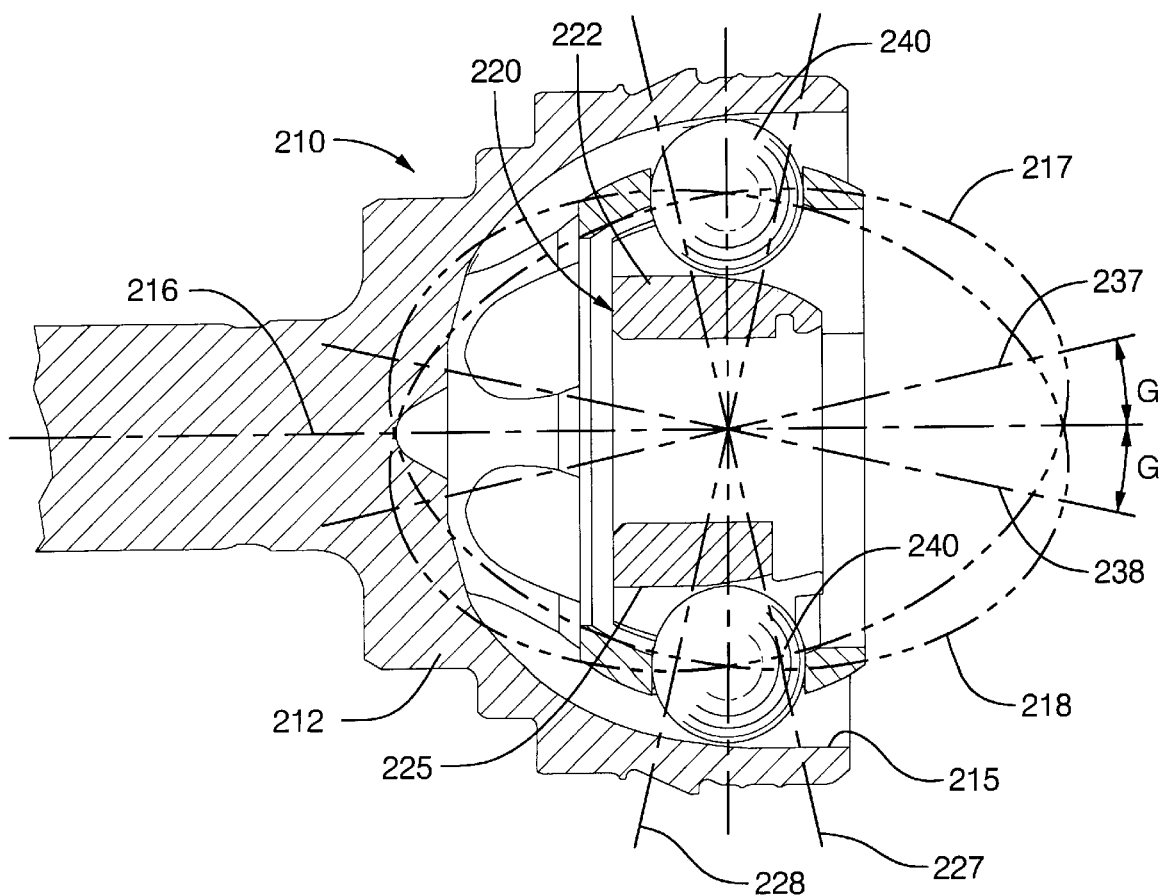
FIG. 10 is an axial section of another embodiment of the constant velocity joint of this invention based on elliptical groove profiles.

Another embodiment of this invention can be obtained by defining the grooves of the inner and outer races as elliptical as shown in FIG. 10. In this embodiment, parts corresponding to those in the embodiment of FIGS. 1 and 2 have reference numerals 200 higher. A mirrored pair of ellipses 217 and 218 are centered on the joint axis with their major axes angled oppositely with respect to the joint axis by an identical angle G, shown as, but not limited to, 14.5 degrees. The profile of groove 215 in outer race 212 (at the bottom of the Figure) traces an adjacent portion of ellipse 218, the major axis 238 of which is tilted clockwise in the Figure; and the profile of associated groove 225 of inner race 222 (also at the bottom of the Figure) traces an adjacent portion of ellipse 217, the major axis of which is tilted counter-clockwise in the Figure. The tilting of the ellipses creates the required funnel angle at zero degree joint angles. The radial approach of the ball toward the joint center as the joint is articulated reaches its minimum when the ball center coincides with the minor axis 228 for groove 215 and minor axis 227 for groove 225. The result of this embodiment is similar to the embodiment of FIGS. 1 and 2 in reducing the maximum amount X of ball movement below the ball center radius and thus providing a high ratio $R_x$=BCR/X as previously described.

What is claimed is:
1. A torque transmitting constant velocity joint comprising an outer joint member having a plurality of longitudinal grooves equally spaced around the joint axis, an inner joint member having an equal plurality of longitudinal grooves equally spaced around the joint axis, a plurality of balls each retained in one of the longitudinal grooves of the outer joint member and one of the longitudinal grooves of the inner joint member, a cage having cage windows with each of the balls further retained within one of the cage windows, the balls thus being constrained by the grooves of the inner and outer joint members and the cage to remain in alignment in a plane which bisects an angle between planes normal to the rotational axes of the outer and inner members with variations in joint angle therebetween, the balls defining ball centered positions at a ball center radius from the joint axis when the joint angle is zero and each of the grooves defining ball centered points of contact with each of its associated grooves when its associated ball is in its ball centered position, each of the longitudinal grooves of the outer joint member on the inner side of its ball centered points of contact and each of the longitudinal grooves of the inner joint member on the outer side of its ball centered points of contact having a radial profile providing a ratio of the ball center radius to the maximum ball movement radially inward from the ball center radius of 45 or greater at a joint angle of 46 degrees, and the radial profiles of each of the longitudinal grooves of the outer joint members and the inner joint members retaining a ball varying in distance from the joint center through their ball centered points of contact so as to create a minimum funnel angle at the ball centered position.

2. The torque transmitting constant velocity joint of claim 1 in which the radial profile of each of the longitudinal grooves of the outer joint member over the majority of its extent on the inner side of the ball centered point of contact defines an arc having a curvature substantially less than or equal to that of a circle centered on the joint center.

3. The torque transmitting constant velocity joint of claim 2 in which the arc is a circular arc centered on the joint center.

4. The torque transmitting constant velocity joint of claim 2 in which the arc is an elliptical arc based on a major axis centered on the joint center and angled with respect to the joint axis to provide a predetermined funnel angle when the joint angle is zero.

5. The torque transmitting constant velocity joint of claim 2 in which a portion of the radial profile of each of the longitudinal grooves of the outer joint member adjacent and on the inner side of the ball centered point of contact decreases in distance from the joint center with ball movement inward from the ball centered point of contact.

6. A torque transmitting constant velocity joint comprising an outer joint member having a plurality of longitudinal grooves equally spaced around the joint axis, an inner joint member having an equal plurality of longitudinal grooves equally spaced around the joint axis, a plurality of balls each retained in one of the longitudinal grooves of the outer joint member and one of the longitudinal grooves of the inner joint member, a cage having cage windows with each of the balls further retained within one of the cage windows, the balls thus being constrained by the grooves of the inner and outer joint members and the cage to remain in alignment in a plane which bisects an angle between planes normal to the rotational axes of the outer and inner members with variations in joint angle therebetween, the balls defining ball centered positions at a ball center radius from the joint axis when the joint angle is zero and each of the grooves defining ball centered points of contact with each of its associated grooves when its associated ball is in its ball centered position, each of the longitudinal grooves of the outer joint member on the inner side of its ball centered point of contact and each of the longitudinal grooves of the inner joint member on the outer side of its ball centered point of contact having a radial profile providing a rate of decrease in distance from the joint center which decreases from a first rate of decrease at the ball centered point of contact producing a predetermined funnel angle to a second, smaller rate of decrease at a predetermined point axially inward of the ball centered point of contact and maintaining the rate of decrease no larger than the second, smaller rate of decrease axially inward of the predetermined point.

7. The torque transmitting constant velocity joint of claim 6 in which the groove has a profile axially inward from the predetermined point that is substantially a circular arc centered on the joint center.

8. The torque transmitting constant velocity joint of claim 6 in which the groove has a profile axially inward from the predetermined point that is an elliptical arc based on a major axis centered on the joint center and angled with respect to the joint axis to provide a predetermined funnel angle when the joint angle is zero.

9. A torque transmitting constant velocity joint comprising an outer joint member having a plurality of longitudinal grooves equally spaced around the joint axis, an inner member having an equal plurality of longitudinal grooves equally spaced around the joint axis, a plurality of balls each retained in one of the longitudinal grooves of the outer joint member and one of the longitudinal grooves of the inner joint member, a cage having cage windows with each of the balls further retained within one of the cage windows, the balls thus being constrained by the grooves of the inner and outer joint members and the cage to remain in alignment in a plane which bisects an angle between planes normal to the rotational axes of the outer and inner members with variations in joint angle therebetween, the balls defining ball centered positions at a ball center radius from the joint axis when the joint angle is zero and each of the grooves defining ball centered points of contact with each of its associated grooves when its associated ball is in its ball centered position, each of the longitudinal grooves of the outer joint member on the inner side of its ball centered point of contact and each of the longitudinal grooves of the inner joint member on the outer side of its ball centered point of contact providing a funnel angle decreasing from a first predetermined funnel angle at the ball centered point of contact to a second, smaller predetermined funnel angle at a predetermined point axially inward of the ball centered point of contact and maintaining the funnel angle no larger than the second, smaller predetermined funnel angle axially inward of the predetermined point.

10. The torque transmitting constant velocity joint of claim 9 in which the groove has a profile axially inward from the predetermined point that is substantially a circular arc centered on the joint center.

11. The torque transmitting constant velocity joint of claim 9 in which the groove has a profile axially inward from the predetermined point that is an elliptical arc based on a major axis centered on the joint center and angled with respect to the joint axis to provide a predetermined funnel angle when the joint angle is zero.

12. A torque transmitting constant velocity joint comprising an outer joint member having a plurality of longitudinal grooves equally spaced around the joint axis, an inner member having an equal plurality of longitudinal grooves equally spaced around the joint axis, a plurality of balls each retained in one of the longitudinal grooves of the outer joint member and one of the longitudinal grooves of the inner joint member, a cage having cage windows with each of the balls further retained within one of the cage windows, the balls thus being constrained by the grooves of the inner and outer joint members and the cage to remain in alignment in a plane which bisects an angle between planes normal to the rotational axes of the outer and inner members with variations in joint angle therebetween, the balls defining ball centered positions at a ball center radius from the joint axis when the joint angle is zero and each of the grooves defining ball centered points of contact with each of its associated grooves when its associated ball is in its ball centered position, each of the longitudinal grooves of the outer joint member having a radial profile comprising an arc axially inward of the ball centered point of contact centered on the joint center, an arc axially outward of the ball centered point of contact centered at an offset from the joint center, and a line joining the arcs and tangent to each.

13. A torque transmitting constant velocity joint comprising an outer joint member having a plurality of longitudinal grooves equally spaced around the joint axis, an inner member having an equal plurality of longitudinal grooves equally spaced around the joint axis, a plurality of balls each retained in one of the longitudinal grooves of the outer joint member and one of the longitudinal grooves of the inner joint member, a cage having cage windows with each of the balls further retained within one of the cage windows, the balls thus being constrained by the grooves of the inner and outer joint members and the cage to remain in alignment in a plane which bisects an angle between planes normal to the rotational axes of the outer and inner members with variations in joint angle therebetween, the balls defining ball centered positions at a ball center radius from the joint axis when the joint angle is zero and each of the grooves defining ball centered points of contact with each of its associated grooves when its associated ball is in its ball centered position, each of the longitudinal grooves of the outer joint member having a radial profile comprising an elliptical arc having a minor axis intersecting the groove profile on the inner side of the ball centered point of contact and each of the longitudinal grooves of the inner joint member having a radial profile comprising an elliptical arc based on a major axis centered on the joint center and angled with respect to the joint axis to provide a predetermined funnel angle when the joint angle is zero.

* * * * *